(12) United States Patent
Morovic et al.

(10) Patent No.: US 10,809,699 B2
(45) Date of Patent: Oct. 20, 2020

(54) METHOD FOR GENERATING THREE DIMENSIONAL OBJECT MODELS FOR AN ADDITIVE MANUFACTURING PROCESS

(71) Applicant: HEWLETT-PACKARD DEVELOPMENT COMPANY, L.P., Houston, TX (US)

(72) Inventors: Jan Morovic, Colchester (GB); Peter Morovic, Sant Cugat del Valles (ES); Scott White, Barcelona (ES); Juan Manuel Garcia Reyero Vinas, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/544,936

(22) PCT Filed: Apr. 24, 2015

(86) PCT No.: PCT/EP2015/058915
§ 371 (c)(1),
(2) Date: Jul. 20, 2017

(87) PCT Pub. No.: WO2016/169613
PCT Pub. Date: Oct. 27, 2016

(65) Prior Publication Data
US 2018/0032059 A1 Feb. 1, 2018

(51) Int. Cl.
*G05B 19/4099* (2006.01)
*B33Y 50/00* (2015.01)
*B29C 64/386* (2017.01)

(52) U.S. Cl.
CPC ........ *G05B 19/4099* (2013.01); *B29C 64/386* (2017.08); *B33Y 50/00* (2014.12);
(Continued)

(58) Field of Classification Search
CPC ...... G05B 19/4099; G05B 2219/49023; B33Y 50/00; B29C 64/386; Y02P 80/40; Y02P 90/265
See application file for complete search history.

(56) References Cited

U.S. PATENT DOCUMENTS 5,977,982 A 11/1999 Lauzon
8,831,366 B1 9/2014 Hickman et al.
(Continued)

FOREIGN PATENT DOCUMENTS

WO WO-2013113372 8/2013
WO WO-2013113372 A1 * 8/2013 ............. B33Y 50/00

OTHER PUBLICATIONS

Rowe, J., et al; "Acquisition, Representation, Query and Analysis of Spatial Data: a Demonstraction 3D Digital Library"; Mar. 30, 2003; http://dl.acm.org/ft_gateway.cfm?id=827162&ftid=242755&dwn=1&CFID=475692491&CFTOKEN=39531292.

*Primary Examiner* — Thomas C Lee
*Assistant Examiner* — Michael Tang
(74) *Attorney, Agent, or Firm* — HP Inc. Patent Department

(57) ABSTRACT

The application refers to a method for generating three-dimensional object models for an additive manufacturing process in a layer-by-layer manner, e.g. 3D-printing, and to generating control data for use by the print apparatus. The object models are generated from a geometric description and from object generation data, which comprise the print apparatus and attributes such as a halftone scheme, a print apparatus setting, an object structure and a print material coverage representation. The method is implemented in the form of a computer software product and generates data specific for each identifies printing device.

20 Claims, 2 Drawing Sheets

(52) U.S. Cl.
CPC ..... *G05B 2219/49023* (2013.01); *Y02P 80/40* (2015.11); *Y02P 90/265* (2015.11)

(56) References Cited

U.S. PATENT DOCUMENTS

| | | | |
|---|---|---|---|
| 2005/0131659 A1* | 6/2005 | Mei | G06T 17/10 703/1 |
| 2008/0285082 A1* | 11/2008 | Morooka | G06F 17/248 358/1.18 |
| 2011/0096083 A1 | 4/2011 | Schultz | |
| 2011/0205583 A1 | 8/2011 | Young et al. | |
| 2012/0224755 A1* | 9/2012 | Wu | G06T 17/00 382/131 |
| 2013/0132039 A1 | 5/2013 | Flammenspeck | |
| 2013/0201518 A1* | 8/2013 | Pan | G06F 3/1204 358/1.15 |
| 2014/0240735 A1* | 8/2014 | Salgado | G06F 3/1204 358/1.13 |
| 2015/0064299 A1* | 3/2015 | Koreis | G06Q 30/0603 425/375 |
| 2015/0071485 A1* | 3/2015 | Rhoads | G01J 3/0272 382/100 |
| 2015/0142152 A1* | 5/2015 | Rezayat | B29C 64/386 700/98 |
| 2015/0153971 A1* | 6/2015 | Aoki | G06F 3/1206 358/1.15 |
| 2015/0205544 A1* | 7/2015 | Webb | H04N 1/32539 358/1.15 |
| 2015/0351467 A1* | 12/2015 | Simoes | A41D 13/015 700/98 |
| 2016/0096318 A1* | 4/2016 | Bickel | B29C 67/0051 264/40.1 |
| 2016/0101570 A1* | 4/2016 | Iorio | G05B 19/4099 700/98 |
| 2016/0185044 A1* | 6/2016 | Leonard | B29C 67/0088 700/98 |
| 2016/0209819 A1* | 7/2016 | Cudak | G05B 15/02 |

* cited by examiner

METHOD FOR GENERATING THREE DIMENSIONAL OBJECT MODELS FOR AN ADDITIVE MANUFACTURING PROCESS

BACKGROUND

Three dimensional objects generated by an additive manufacturing process may be formed in a layer-by-layer manner. In one example of additive manufacturing, an object is generated in a print apparatus by solidifying portions of layers of build material. In examples, the build material may be in the form of a powder, fluid or sheet material. The intended solidification and/or physical properties may be achieved by printing an agent onto a layer of the build material. In other examples, chemical binding agents may be used to solidify a build material. Energy may be applied to the layer and the build material to which an agent has been applied may coalesce and solidify upon cooling. In other examples, three dimensional objects may be generated by using extruded plastics or sprayed materials as build materials, which solidify to form an object.

Some print apparatus that generate three dimensional objects use control data generated from a model of a three dimensional object. This control data may, for example, specify the locations at which to apply an agent to build material, or where build material itself may be placed, and the amounts to be placed.

The control data may be generated from a 3D representation of an object to be printed.

BRIEF DESCRIPTION OF DRAWINGS

For a more complete understanding, reference is now made to the following description taken in conjunction with the accompanying drawings in which.

DETAILED DESCRIPTION

Figure 1:
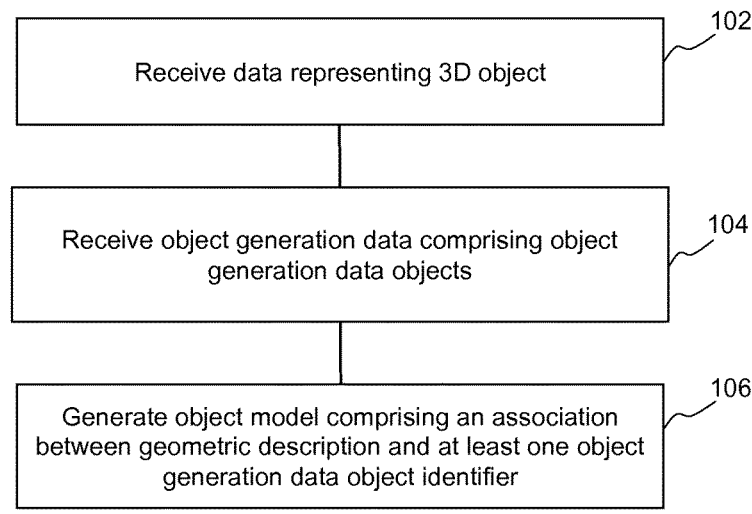
FIG. 1 is a flowchart of an example of a method for generating an object model.

Some examples described herein provide an apparatus and a method for representing a three dimensional object and/or for generating control data that may be used by print apparatus to produce a three dimensional object. Some examples allow arbitrary three dimensional content with a variety of specified object properties to be processed and used to generate a three dimensional object. These object properties may comprise conductivity, density, porosity, appearance properties (for example color, transparency, surface roughness, glossiness, etc.) and/or mechanical properties (for example strength, inter-layer strength, flexibility, elasticity, rigidity, etc.), or the like.

In some examples, print material data is defined, for example detailing the amount of print materials (such as agent(s) to be deposited onto a layer of build material, or in some examples, build materials themselves), and, if applicable, their combinations. In some examples, this may be specified as a proportional volume coverage (for example, X % of a region of a layer of build material should have agent Y applied thereto). Such print materials may be related to or selected to provide an object property.

The actual location at which each print material (for example, a drop of an agent) should be applied, as specified in control data, may be determined using halftoning techniques.

For example, a region within data representing an object may have an associated print material coverage representation, for example comprising a set of material volume coverage vectors detailing the amount of print materials to be deposited in the region. In a simple case, such a vector may indicate that X % of a given region of three dimensional space should have a particular agent applied thereto, whereas (100-X) % should be left clear of agent. The print material coverage representation may then provide the input for a 'halftoning' process to generate control data that may be used by an additive manufacturing system to produce a three dimensional object. For example, it may be determined that, to produce specified object properties, 25% of a layer of build material (or of a portion of a layer) should have an agent applied thereto. The halftoning process determines where the drops of agent fall in order to provide 25% coverage, for example by comparing each location to a threshold value provided in a halftone threshold matrix.

The object properties achievable may vary between print apparatus, for example based on the print materials available at a particular print apparatus, or the resolution with which they can be applied. In addition, various halftone schemes exist, such as void-and-cluster, error diffusion, dither, AM-screens, cluster-dot type patterns or the like. In some examples, the choice of halftone scheme can impact an object property such that the same combination of print materials can result in a different object property (or an object property having a different value) if a different halftone scheme is selected. The halftoning schemes available may differ between print apparatus.

FIG. 1 is an example of a method for generating an object model. In block 102, data comprising a geometric description of at least a portion of a three dimensional object is received. The data may for example be the output of a Computer Aided Design (CAD) program, or some other digital representation of a three dimension object.

In some examples, the description may comprise point locations, for example [x, y, z] coordinates defining a point in space. The point locations may be linked by vectors, which may define a polygon mesh. In other examples, the locations may comprise regions, for example voxels, i.e. three dimensional pixels, wherein each voxel occupies a discrete volume. A voxel at a given location may have at least one characteristic. For example, it may be empty, or may have a particular color or may represent a particular material, or a particular object attribute, or the like. Such voxels may be all of the same size, or may be different sizes. Other volumetric descriptions may be used to describe an object. In some examples, the received data may comprise an object attribute, for example specifying an object property, or other attributes to be used in object generation associated with at least one location within the object.

In block 104, object generation data is received. The object generation data comprises a plurality of object generation data objects, each object generation data object being associated with a print apparatus and an identifier and comprising an object attribute description of an attribute achievable by the print apparatus. The association with a print apparatus may comprise an association with a single print apparatus, a set of print apparatus, a class of print apparatus or the like. The attribute described by the object attribute description may for example comprise an object property such as a color, or another object attribute such as a substructure or an aspect of object generation process, which may in some examples result in a particular property.

In some examples, at least some information contained within or represented by at least a subset of the plurality of object generation data objects is presented to a user as a selectable list, or the like.

In some examples, object generation data objects may be associated with plurality, or class, of print apparatus. A user may select (or there may be automatically selected) a print apparatus, for example based on availability, cost or performance of the print apparatus. In some such examples, following such selection, information relating to a subset of data objects, comprising those data objects which are associated with the selected print apparatus may be presented for user or automatic selection.

In some examples, the user may be able to select object generation data objects based on object attribute descriptions specified in the object generation data objects, for example in order to associate a particular object attribute description with a portion/point location of a geometric model of an object to be generated. In other examples, the user may freely specify an attribute and choose between a number of object generation data objects which provide, or approximate, the attribute. Such selection may be carried out automatically, for example based on a hierarchy or predetermined selection criteria. In some examples, the object generation data objects may specify a substructure as an attribute of an object, which is distinct from the object geometry, for example comprising a lattice like structure which may be applied such that a generated object has a lattice substructure, and a user may select between substructures.

As noted above, in some examples, object attributes may be received with the geometric description. In some examples, different regions or location within the geometric description may be associated with different, or different combinations of object properties. If more than one data object specifies a particular object attribute, a selection of a data object for a location or a region of the object having the specified object attribute may be confined to just those data objects which specify or approximate such an object attribute.

Object generation data object selection options presented to a user may be based on previous selections such that the object attributes selected as a whole are achievable in combination by a single print apparatus (for example, the set of attributes as whole specified for a region or location in an object is described in at least one individual object generation data object). In some examples, if user attempts to specify or select an attribute or combination of attributes which is not found in any individual data object, or a combination of data objects which are not associated with a common print apparatus, then an alert may be generated and/or the user may be prompted to select data objects/attributes, or combinations thereof, which are compatible.

In block 106, an object model is generated. The object model comprises an association between the geometric description and at least one object generation data object identifier. This may comprise associating a data object with a location (which may be a point location or a region, such as a voxel) in the geometric description of the object. In some examples, different object generation data objects may be associated with different locations within the geometric description of the object and/or an object generation data object may be associated with a plurality of locations. In some examples, a preview (for example, a visual representation) of a three dimensional object generated with print material(s) applied to achieve the attribute may be generated, and for example displayed to a user. As such a preview is based on attributes which are achievable by a print apparatus, it is more likely to accurately represent the outcome of an object generation process and therefore allows a user to have more certainty that their design is as intended.

By restricting or encouraging a designer to use predetermined object generation data objects, rather than freely specifying object attributes, a design incorporates achievable attributes (or achievable combinations of attributes), and frustration and waste is reduced. As the identifier serves to identify the object attributes and data to generate control data may be specified or determined therefrom, the full object generation data object need not be stored and/or transmitted with the object model, and therefore the model may be economical with respect to transmission bandwidth and/or data storage.

In addition, in examples where a range of achievable object attributes within data objects are exposed to a user, the user may be able to more fully utilize the capabilities of a print apparatus, in particular if the user is otherwise unaware of the full range of capabilities.

In some examples, the object model may be sent for generation by a print apparatus. The object model may be sent directly to a print apparatus, or to an intermediate processing device, which may direct the object model as a print request and/or may generate control data to generate the object. In some examples, the identifier can serve to identify a combination of print materials.

Figure 2:
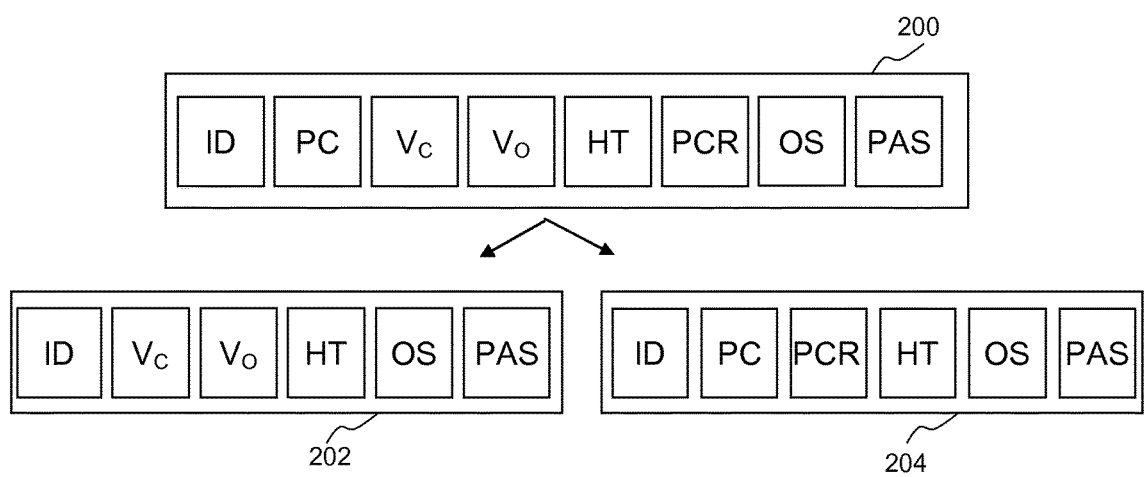
FIG. 2 is a schematic representation of examples of object generation data objects.

A schematic representation of examples of object generation data objects 200, 202, 204 is shown in FIG. 2. In this example, a first data object 200 comprises an identifier ID, a print apparatus class PC, a plurality of property description values V, a halftone scheme HT, a print material coverage representation PCR, an object substructure OS, and print apparatus setting data PAS.

The print apparatus class PC identifies a class of print apparatus capable of providing a combination of materials specified in the print material coverage representation PCR. In other examples, one or a plurality of specific printers may be identified.

The property description values V this example comprise a color value $V_c$ and an opacity value $V_O$. In other examples, other object properties may be described, and may comprise any of the properties mentioned above as well as any of, amongst others: flexibility; stiffness; conductivity; elasticity; rigidity; surface roughness; porosity; strength, or the like.

The halftone scheme HT may comprise any suitable scheme such as void-and-cluster, error diffusion, dither, AM-screens, cluster-dot type patterns or the like, which may in some examples be for use in generating halftone thresholds. As the choice of halftone scheme can affect a how (and in some examples, whether) an attribute is reproduced in a generated object, specifying the scheme, exposing a scheme to a designer, or allowing the designer to specify the scheme, may result in an object and/or attribute being more faithfully or reliable generated.

The print apparatus setting PAS may for example comprise any, or any combination of: a speed setting, a resolution setting (for example, a 'draft' setting could be used for some articles while others may specify a high quality finish), a heat setting (as application of different temperatures can have an effect on some object attributes), specification of a single or multiple pass of a printhead applying an agent when printing a layer (which may affect the amount and/or resolution in which agent is applied and therefore the achievable object attributes, and which may including specification of whether printing takes place in one direction as a printhead passes over the layer or in both directions), specification of the time between subsequent layers being printed (which may affect interlayer strength), or any other setting of the print apparatus which may affect an object attribute.

The object substructure OS may specify that at least a portion of the object has a substructure which is specified separately from its geometry. For example, an object having a particular geometry may be specified to have a substructure which is solid, or lattice-like (for example, being formed as a regular lattice such as a cubic or tetrahedral lattice, or a irregular lattice formed in a vein like or branch like manner), or has a crystalline substructure of close packed or separated solid elements. Selection of some substructures as an object attribute may result in certain object properties, for example an object with a substructure including voids may be lighter, more shock resistant and/or more resilient or elastic than a solid object, and/or may reduce print material usage. The term 'substructure' is used to distinguish from the shape and form of an object model. In some examples, a substructure may be applied to the object geometry, while in other examples, it may be applied with a halftone scheme, for example by forming a halftone threshold matrix having a substructure. Such a halftone matrix may be applied to a print material coverage representation to result in control data which specifies that print materials (for example, agents which may cause the build material to which they are applied to coalesce on the application of heat) are not deposited where the threshold matrix does not exist. In some examples, the lattice may be as described in PCT/US2015/013841, the teaching of which is incorporated herein to the fullest extent possible.

The print material coverage representation PCR provides print material data and in some examples comprises at least one material volume coverage (Mvoc) vector.

An Mvoc vector may have a plurality of values, wherein each value defines a proportion for each, or each combination of print materials in an addressable location of a layer of the three dimensional object. For example, in an additive manufacturing system with two available print materials (for example, agents)—M1 and M2, where each print material may be independently deposited in an addressable area of a layer of the three dimensional object, there may be $2^2$ (i.e. four) proportions in a given Mvoc vector: a first proportion for M1 without M2; a second proportion for M2 without M1; a third proportion for an over-deposit (i.e. a combination) of M1 and M2, e.g. M2 deposited over M1 or vice versa; and a fourth proportion for an absence of both M1 and M2. In this case an Mvoc vector may be: [M1, M2, M1M2, Z] or with example values [0.2, 0.2, 0.5, 0.1]—i.e. in a given [x, y] location in a z slice, 20% M1 without M2, 20% M2 without M1, 50% M1 and M2 and 10% empty. As each value is a proportion and the set of values represent the available material combinations, the set of values in each vector sum to 1 or 100%.

For example, in a case where the agents are colored, then the Mvoc vector may be determined to select agent combinations that generate a match with a supplied object attribute, e.g. a supplied RGB value. This mapping between a color and an Mvoc vector may be predetermined, and for example held in a look-up table.

As the plurality of property description values V, the halftone scheme HT, the print material coverage representation PCR, the object substructure OS, and the print apparatus setting data PAS all effect attributes of a generated object, they each provide an example of an object attribute description.

The first data object 200 comprises an indication of a plurality of data categories. In this example, it specifies both print material coverage PCR and object property description values V. While the latter is of use in generating control data, the former may be more readily specified or understood by a designer, who may not have any interest in what materials are used to produce the object. It may be therefore that an identifier is associated with a plurality of data objects, each comprising pertinent information according to their intended purpose. Other examples may have different data categories.

For example, a second data object 202 comprising a subset of the data categories may be provided to a designer. This comprises, in this example, the identifier ID, the property description values V, a halftone scheme HT, an object substructure OS and print apparatus setting data PAS. The user may select a data object based on any, or any combination of, intended object attributes, such as are described or represented by an object property description value, a halftone scheme, an object substructure and/or a print apparatus setting, and the identifier may be used to identify the data object. It will be noted that, in this example, the object generation data object 202 does not specify a print apparatus or print apparatus class, but is nevertheless associated with a print apparatus class via the identifier, which is also associated with the first object generation data object 200.

A third data object 204 comprising a different subset of the data categories may be provided to print apparatus, or to processing apparatus to generate control data. This subset comprises, in this example, the identifier ID, a print apparatus class PC, a halftone scheme HT, a print material coverage representation PCR, an object substructure OS and print apparatus setting data PAS. In another example, the object property values may be supplied, for example in place of the print material coverage representation PCR, as a mapping from object property values to print material coverage representation may be made before control data is generated, for example by use of a look-up table relating at least one object property to a print material coverage. Other subsets of data may be used. For example, in particular if the data object is to be supplied to a particular print apparatus, the print apparatus class PC and/or the identifier ID may not comprise part of the subset.

An identifier ID may associate a set of values, even when a subset of these is exposed at any point in the print pipeline.

In some examples, object generation data objects may be compiled or curated by a print apparatus provider, or an object generation service provider. They may for example be created and/or tested by manufacturing an object having a specified material/combination of materials, using control data generated using a specified halftone scheme, having a specified substructure and/or using the printer control settings. Such an object may be evaluated to determine its properties. It may be possible for a designer to request that a sample be manufactured according to the description provided in an object generation data object. In some examples, a user, for example a designer, may define an object generation data object, for example having seen that it produces intended object attributes. Any object generation data object may be generally publically available or may be exposed in a restricted manner, for example restricted to the designer and control data generation entity, or have any other level of public availability. This may allow object generation data objects to be shared, for example resulting in a library of object generation data objects, which may comprise at least one tested or verified object generation data object.

Figure 3:
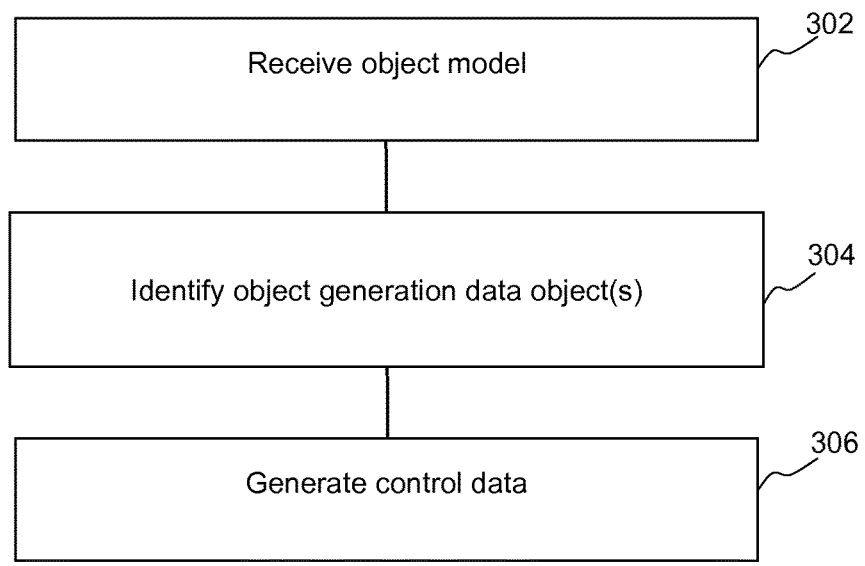
FIG. 3 is a flowchart of an example of a method for generating control data.

FIG. 3 shows an example of a method for generating control data. In block 302, an object model is received. The object model comprises an association between a geometric description of a three dimensional object and at least one object generation data object identifier.

The identifier is used to identify at least one object generation data object (block 304). The object generation data object is associated with a print apparatus and comprises an identifier and an object attribute description of an attribute achievable by the print apparatus. For examples, the object attribute description may specify data to determine a combination of print materials available at the print apparatus which produce a predetermined object property. The data to determine a combination of print materials in some examples comprises a print material coverage representation and in other examples comprises an object property description, wherein the object property or properties described thereby are achievable by the print apparatus, and which may be mapped to a print material coverage to produce the properties. The object generation data object may for example have a form similar to the first object generation data object 200 or the third object generation data object 204 in FIG. 2. In some examples, there may be a plurality of object generation data objects, each associated with a location (which may be a point location, or may be a region) in geometric description Control data is generated from identified object generation data object(s), the control data being for use by the print apparatus in generating the three dimensional object (block 306). The control data may for example be generated by operating on a print material coverage representation PCR using halftone threshold data, in some examples as specified by a halftone scheme HT. The control data may for example be in the form of a set of discrete print material choices for a pixel in a plane, wherein the discrete values across the area of the plane may be representative of proportions set out in the print material coverage representation, and the plane relates to a layer in layer-by-layer object generation. In examples in which the object generation data object comprises a print apparatus setting PAS, the control data may comprise at least one print apparatus setting.

Figure 4:
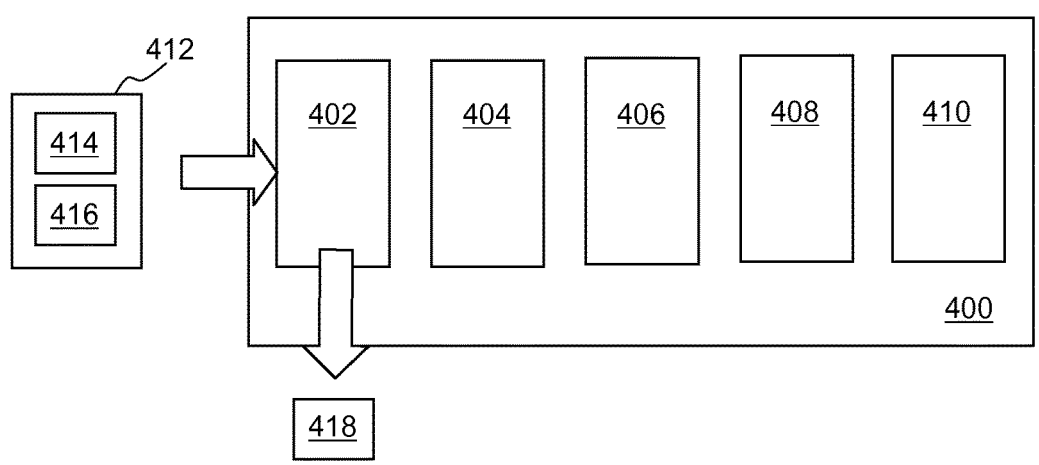
FIG. 4 is a simplified schematic of an example of processing apparatus for generating an object model.

FIG. 4 shows an example of processing apparatus 400 that may be used to generate an object model. The processing apparatus 400 in this example executes instructions which may be provided in a computer readable medium. The processing apparatus 400 comprises an interface 402, a model generator 404, a memory 406, a data processor 408 and a preview module 410. The interface 402, model generator 404, data processor 408 and preview module 410 in this example are provided by executing instructions, which in this case are held in the memory 406, which provides a computer readable medium.

The instructions held in the memory 406 provide an interface 402, which receives data 412 comprising a geometric description 414 representing at least a portion of a three dimensional object, and object generation data 416.

The geometric description 414 may define the shape and extent of all or part of an object in a three dimensional co-ordinate system, e.g. the solid portions of the object. In one example, the geometric description 414 may comprise voxels that are defined in a three dimensional (also referred to herein as [x, y, z]) space. A given voxel may have associated data that indicates whether a portion of the object is present at that location. In other examples, the geometric description 414 specifies locations within an object, e.g. at [x, y, z] co-ordinates. In some examples, the geometric description 414 may describe the object as a polygon mesh.

The object generation data 416 comprises a plurality of object generation data objects, for example having a form similar to the first object generation data object 200 or the second object generation data object 202 as shown in FIG. 2. Each object generation data object is associated with a print apparatus and an object attribute description of an attribute achievable by the print apparatus. Each object generation data object may comprise an identifier The instructions held in the memory 406 provide a model generator 404 which generates an object model 418 representing the object. The object model 418 comprises an association between the geometric description 414 and at least one object generation data object, and may be stored in the memory 406. The object model 418 may be sent via the interface 402 for generation by a print apparatus. In some examples, an identifier, rather than the object generation data object as a whole, is stored, such that economical use is made of the storage space of the memory 406.

The instructions held in the memory 406 provide a preview module 410, which generates a preview of an object generated using control data produced using the object generation data object(s). This preview may for example be displayed to a user of the processing apparatus 400, for example on a display screen thereof.

The interface 402 may, in some examples, accept a user selection of an object generation data object and the model generator 410 is to generate an object model having an association between the geometric description and the selected object generation data object. The user selection may be via any user interface device, such as a text input, a touch screen, a mouse, or the like. The user may, for example, be able to 'tag' a location or portion a geometric model (which may for example be displayed on a screen) with an association to an object generation data object.

In some examples, the interface 402 accepts a user specification of an attribute (for example, a property such as a color, a substructure, or a halftone scheme) and the instructions held in the memory 406 provide a data processor 408, which identifies an object generation data object having an object attribute description which comprises the specified attribute. If more than one object generation data object is identified, a user may select among these, or an object generation data object may be selected automatically, for example based on a predetermined hierarchy.

The data processor 408 in this example also identifies incompatible object generation data objects (e.g. combinations of attributes which are outside the capabilities of an available print apparatus) prevents incompatible object generation data objects from being associated with the geometric description.

Examples in the present disclosure can be provided as methods, systems or machine readable instructions, such as any combination of software, hardware, firmware or the like. Such machine readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus, such the processing apparatus 400 may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices provide a means for realizing functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It should be noted that the above-mentioned examples illustrate rather than limit what is described herein, and that those skilled in the art will be able to design many alternative implementations without departing from the scope of the appended claims. In particular, a feature or block from one example may be combined with or substituted by a feature/block of another example The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
receiving data comprising a geometric description of at least a portion of a three dimensional object;
receiving object generation data, the object generation data comprising a plurality of object generation data objects, each object generation data object being associated with a print apparatus and an identifier and comprising an object attribute description of an attribute of the three dimensional object to be formed that is achievable by the associated print apparatus;
generating an object model, the object model comprising an association between the geometric description and at least one object generation data object identifier; and
using the object model to form the three dimensional object with a print apparatus.

2. A method according to claim 1, in which the plurality of object generation data objects are associated with a specific class of print apparatus and generating an object model comprises selecting a particular print apparatus.

3. A method according to claim 1, in which at least one of the plurality of object generation data objects comprise specification of a particular half-toning scheme that produces a different object attribute than another half-toning scheme on the print apparatus.

4. A method according to claim 1, in which the object generation data object further comprises specification of a substructure to be formed while forming and within the object.

5. A method according to claim 1, in which the object generation data object further comprises specification of a print material coverage representation.

6. A method comprising:
receiving an object model, the object model comprising a geometric description of a three dimensional object and at least one object generation data object identifier;
using the identifier to identify an object generation data object, the object generation data object being associated with a specific print apparatus or specific class of print apparatuses and comprising an object attribute description of an attribute of the three dimensional object that is achievable by the print apparatus;
generating control data from the object generation data object, the control data being for use by the print apparatus in generating the three dimensional object; and
using the control data to generate the three-dimensional object with the print apparatus.

7. A method according to claim 6 in which the object attribute description comprises a halftone scheme and the method comprises generating control data according to the halftone scheme.

8. A method according to claim 6 in which the object attribute description comprises a print apparatus setting and the method comprises generating control data comprising the print apparatus setting.

9. A method according to claim 6 in which the object attribute description comprises an object substructure and the method comprises generating control data to generate an object having the object substructure.

10. A non-transitory computer readable storage medium encoded with instructions, executable by a processor comprising:
instructions to provide an interface to receive:
a geometric description representing at least a portion of a three dimensional object, and
object generation data, the object generation data comprising a plurality of object generation data objects, each object generation data object comprising an object identifier, identification of a class of print apparatus, an object attribute description of an attribute of the three dimensional object to be formed that is achievable by a print apparatus in the class, and a specified halftone scheme;
instructions to generate an object model representing the object, the object model comprising an association between the geometric description and at least one object generation data object; and instructions to output the object model to a printing apparatus in the class for fabrication of three dimensional object specified by the object model.

11. The non-transitory computer readable storage medium according to claim 10 further comprising instructions to generate a preview of the object based on the object model, the preview being generated according to at least one object generation data object associated with the object model.

12. The non-transitory computer readable storage medium according to claim 10 further comprising instructions to send only a subset of the data in the object generation data object, and not all the data of the object generation data object, to a print apparatus for generation of the three dimensional object by the print apparatus.

13. The non-transitory computer readable storage medium according to claim 10 further comprising instructions to accept a user selection of an object generation data object and a model generator is to generate the object model using the geometric description and the user-selected object generation data object.

14. The non-transitory computer readable storage medium according to claim 10 further comprising instructions to accept a user specification of an attribute, and instructions to identify an object generation data object having an object attribute description which describes the specified attribute.

15. The non-transitory computer readable storage medium according to claim 10 further comprising instructions to identify incompatible object generation data objects and to prevent incompatible object generation data objects from being associated with the geometric description.

16. The non-transitory computer readable storage medium according to claim 10 wherein each object generation data object further comprises a specification of substructure of the three dimensional object to be formed.

17. The non-transitory computer readable storage medium according to claim 10 wherein each object generation data object further comprises a print apparatus setting corresponding to the three dimensional object to be formed.

18. The non-transitory computer readable storage medium according to claim 17 wherein each object generation data object further comprises a specification of substructure of the three dimensional object to be formed.

19. The non-transitory computer readable storage medium according to claim 10 wherein the object attribute description of an attribute of the three dimensional object to be formed comprises a color value and an opacity value.

20. The non-transitory computer readable storage medium according to claim 10 wherein the object attribute description of an attribute of the three dimensional object to be formed comprises print material coverage representation, including a material volume coverage vector, that specifies print material coverage to be applied in forming the three-dimensional object.

* * * * *